(12) United States Patent
Gallifet

(10) Patent No.: US 7,971,660 B2
(45) Date of Patent: *Jul. 5, 2011

(54) ROCK BIT WITH A THERMAL INSULATING SEAL RING POSITIONED IN THE SEAL GLAND

(75) Inventor: Thomas Gallifet, Garland, TX (US)

(73) Assignee: Varel International, Ind., L.P., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/870,471

(22) Filed: Aug. 27, 2010

(65) Prior Publication Data

US 2010/0320002 A1     Dec. 23, 2010

Related U.S. Application Data

(63) Continuation of application No. 12/252,252, filed on Oct. 15, 2008.

(60) Provisional application No. 60/984,635, filed on Nov. 1, 2007.

(51) Int. Cl.
    *E21B 10/00* (2006.01)
(52) U.S. Cl. .................................... 175/372
(58) Field of Classification Search ............ 175/371, 175/372
    See application file for complete search history.

(56) References Cited

U.S. PATENT DOCUMENTS

| | | |
|---|---|---|
| 3,397,928 A | 8/1968 | Galle |
| 3,718,338 A | 2/1973 | Traub |
| 3,765,495 A | 10/1973 | Murdoch et al. |
| 4,178,045 A | 12/1979 | Neilson |
| 4,179,003 A | 12/1979 | Cooper et al. |
| 4,194,795 A | 3/1980 | Rife |
| 4,200,343 A | 4/1980 | Highsmith |
| 4,209,890 A | 7/1980 | Koskie, Jr. |
| 4,428,588 A | 1/1984 | Oelke |
| 4,429,854 A | 2/1984 | Kar et al. |
| 4,448,268 A | 5/1984 | Fuller |
| 4,613,004 A | 9/1986 | Shotwell |
| 4,793,424 A | 12/1988 | Lim, Jr. |
| 5,513,715 A | 5/1996 | Dysart |
| 5,570,750 A | 11/1996 | Williams |
| 6,196,339 B1 | 3/2001 | Portwood et al. |
| 6,536,542 B1 | 3/2003 | Fang et al. |
| 6,679,342 B2 | 1/2004 | Portwood et al. |
| 6,789,634 B1 | 9/2004 | Denton |
| 6,837,317 B2 | 1/2005 | Byrd |
| 6,948,715 B2 | 9/2005 | Taylor et al. |
| 7,000,712 B2 | 2/2006 | Byrd |
| 7,117,961 B2 | 10/2006 | Yong et al. |
| 7,461,708 B2 | 12/2008 | Yong et al. |
| 2003/0029645 A1 | 2/2003 | Mourik et al. |
| 2004/0000435 A1 | 1/2004 | Nguyen |
| 2004/0031624 A1 | 2/2004 | Scott et al. |
| 2006/0032673 A1 | 2/2006 | Yong et al. |
| 2008/0099244 A1 | 5/2008 | Chellappa et al. |
| 2008/0121436 A1 | 5/2008 | Slay et al. |
| 2009/0038858 A1 | 2/2009 | Griffo et al. |
| 2009/0321146 A1 | 12/2009 | Dick et al. |

*Primary Examiner* — William P Neuder
(74) *Attorney, Agent, or Firm* — Gardere Wynne & Sewell LLP; Andre M. Szuwalski

(57) ABSTRACT

A rock bit includes a shaft and a cone mounted for rotation about the shaft at a journal bearing. A seal gland for the rock bit is defined at least by the shaft and the cone. A compressible seal ring is positioned within the seal gland. A thermal insulating ring is installed within the seal gland and positioned between the compressible seal ring itself and the journal bearing to insulate the compressible seal ring from heat radiating from the journal bearing.

37 Claims, 5 Drawing Sheets

ROCK BIT WITH A THERMAL INSULATING SEAL RING POSITIONED IN THE SEAL GLAND

PRIORITY CLAIM

The present application is a continuation of U.S. patent application Ser. No. 12/252,252 filed Oct. 15, 2008, which claims the benefit of U.S. Provisional Application for Patent 60/984,635 filed Nov. 1, 2007 entitled "Rock Bit With A Seal Thermal Insulating Ring", the disclosures of which are hereby incorporated by reference to the maximum extent allowable by law.

BACKGROUND OF THE INVENTION

1. Technical Field of the Invention

The present invention relates to earth boring bits, and more particularly to those having rotatable cutters, also known as cones.

2. Description of Related Art

Reference is made to U.S. Pat. No. 3,397,928 to Galle, the disclosure of which is hereby incorporated by reference. Reference is still further made to U.S. Pat. No. 3,765,495 to Murdoch, the disclosure of which is hereby incorporated by reference.

Earth boring bits with rolling element cutters have bearings employing either rollers as the load carrying element or with a journal as the load carrying element. The use of a sealing means in rock bit bearings has dramatically increased bearing life in the past fifty years.

Early seals for rock bits were designed with a metallic Belleville spring clad with an elastomer, usually nitrile rubber (NBR). The metallic spring provided the energizing force for the sealing surface, and the rubber coating sealed against the metal surface of the head and cone and provided a seal on relatively rough surfaces because the compliant behavior of the rubber coating filled in the microscopic asperities on the sealing surface. Belleville seals of this type were employed mainly in rock bits with roller bearings. The seal would fail due to wear of the elastomer after a relatively short number of hours in operation, resulting in loss of the lubricant contained within the bearing cavity. The bit would continue to function for some period of time utilizing the roller bearings without benefit of the lubricant.

A significant advancement in rock bit seals came when o-ring type seals were introduced. These seals, as disclosed by Galle, were composed of nitrile rubber and were circular in cross section. The seal was fitted into a radial gland formed by cylindrical surfaces between the head and cone bearings, and the annulus formed was smaller than the original dimension as measured as the cross section of the seal. The squeeze of the seal was defined as the percentage reduction of the cross section from its original state to the compressed state. Murdoch disclosed a variation of this seal by elongating the radial dimension which, when compared to the seal disclosed by Galle, required less percentage squeeze to form an effective seal. This was referred to in the art as a high aspect ratio seal. Several other minor variations of this concept have been used, each relying on an elastomer seal squeezed radially in a gland formed by cylindrical surfaces between the two bearing elements.

Over time, the rock bit industry has moved from a standard nitrile material for the seal ring, to a highly saturated nitrile elastomer for added stability of properties such as thermal resistance and chemical resistance.

Reference is now made to FIG. 1 which illustrates a prior art configuration for an earth boring bit. FIG. 2 illustrates a close-up view of the prior art configuration focusing on the area of the sealing system 2 and journal bearing 11 associated with a rotating cone 4 and a shaft 5 of the bit head 1. An o-ring seal 6 is squeezed between a cylindrical cone sealing surface 9 and a cylindrical head sealing surface 7. The term "cylindrical" in this context refers to a surface that is parallel to an axis of cone rotation. An inner radial cone surface 8 is provided on the grease side of the seal, while an outer radial head surface 10 is provided on the drilling fluid side of the seal. The term "radial" in this context refers to a surface extending away from the axis of cone rotation. In this illustrated implementation, the radial surfaces 8 and 10 are normal (i.e., perpendicular) to the axis of cone rotation. It will be noted that the sealing pressure is between surfaces 7 and 9.

Reference is now made to FIG. 3 wherein there is shown another prior art seal. In this case the seal is a high aspect ratio seal. It will be noted that the seal 6 is squeezed between the cylindrical cone sealing surface 9 and the cylindrical head sealing surface 7. An inner radial (normal) cone surface 8 is provided on the grease side of the seal, while an outer radial (normal) cone surface 10 is provided on the drilling fluid side of the seal. The normal surfaces 8 and 10 are required to stabilize the seal (for example, prevent motion, buckling, twisting) when in operation. It will also be noted that surface 10 is located on the cone 4 (not the head as in FIG. 2).

FIGS. 2 and 3 both illustrate the use of a journal bushing 12 positioned between the rotating cone 4 and the cantilever bearing shaft 5 in the area of the journal bearing 11.

With the configurations illustrated in FIGS. 1, 2 and 3, the seal 6 is directly exposed to heat generated by the journal bearing 11 associated with the shaft 5 and rotating cone 4. Exposure to this heat during operation of the rock bit is known to change the mechanical properties of the elastomer used for the o-ring seal 6. A reduced seal life results from this heat exposure. A need exists to protect the o-ring seal from this heat exposure.

SUMMARY OF THE INVENTION

An insulating ring is provided in the seal gland to protect the seal from bearing generated heat.

In an embodiment, a ring shaped like a washer is inserted between the o-ring seal and the journal bearing to block or insulate the o-ring seal from heat generated by the journal bearing. This insulating washer is position so as to rest against an inner (grease) side of the seal gland. More specifically, the insulating washer is positioned between the o-ring seal itself and the inner radial surface provided on the grease side of the seal associated with the cone.

In an embodiment, the insulating ring is made of a rigid, insulating material such as a polyetheretherketone (PEEK), also referred to as a polyketone. Functionally-speaking, the insulating ring offers a thermal insulation barrier positioned between the journal bearing (where heat is generated and radiates) and the seal. Heat transmission from the journal bearing to the seal is minimized (substantially reduced in comparison to implementations lacking the insulating ring).

In an embodiment, a seal for a rock bit comprises: a gland including an inner radial surface; a sealing member installed within the gland; and a thermal insulating member installed within the gland between the sealing member itself and the inner radial surface.

In another embodiment, a seal for a rock bit comprises: an annular gland defined in part by an inner radial surface associated with a cone member of the rock bit; an o-ring seal positioned within the annular gland; and a thermal insulating ring installed within the annular gland and positioned between the o-ring seal itself and the inner radial surface of the cone member.

In an embodiment, a rock bit comprises: a shaft; a cone mounted for rotation about the shaft at a journal bearing; a seal gland defined at least by an inner radial surface; a compressible seal ring positioned in the seal gland; and a thermal insulating ring installed within the seal gland and positioned between the compressible seal ring itself and the inner radial surface.

In another embodiment, a rock bit comprises: a shaft; a cone mounted for rotation about the shaft at a journal bearing; a seal gland defined by the cone and shaft; a compressible seal ring positioned in the seal gland; and a thermal insulating ring installed within the seal gland and positioned between the compressible seal ring itself and the journal bearing to insulate the compressible seal ring from heat radiating from the journal bearing.

BRIEF DESCRIPTION OF THE DRAWINGS

Other features and advantages of the invention will become clear in the description which follows of several non-limiting examples, with references to the attached drawings wherein.

DETAILED DESCRIPTION OF THE DRAWINGS

Figure 4:
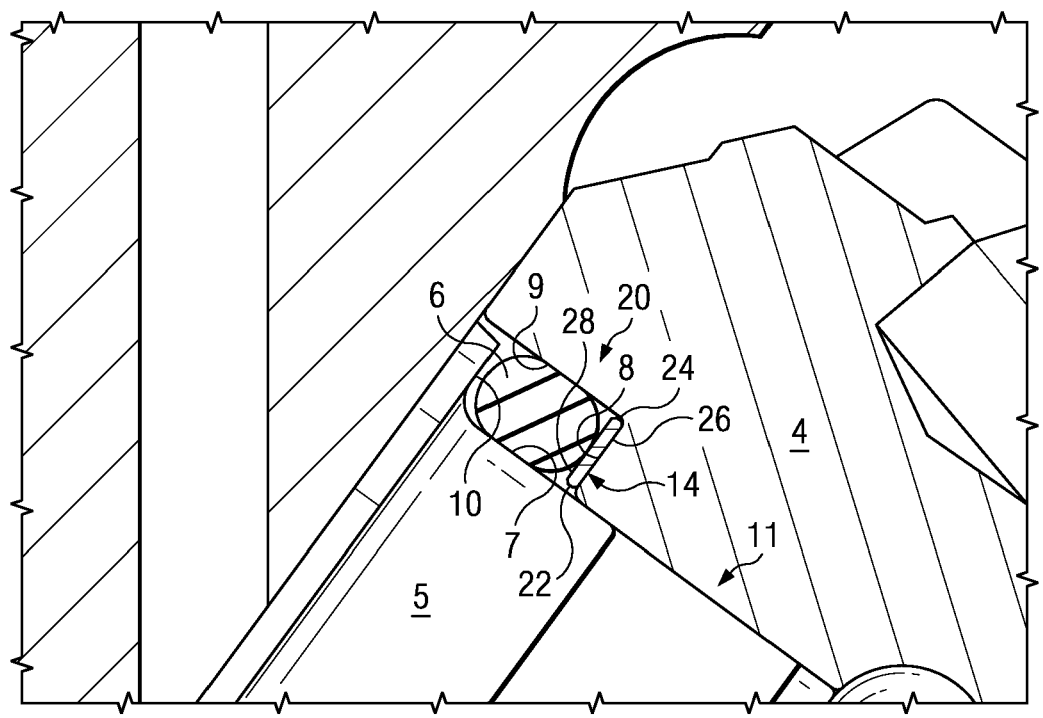
FIGS. 4-6 illustrate embodiments of a seal gland and journal bearing with an insulating ring provided in the seal gland to protect the seal from journal bearing generated heat.

Reference is now made to FIG. 4 which illustrates an embodiment of a seal gland and journal bearing with an insulating ring provided in the seal gland to protect the seal from journal bearing generated heat. The o-ring seal 6 is squeezed between a cylindrical cone sealing surface 9 and a cylindrical head sealing surface 7. An inner radial surface 8 is provided on the grease side of the seal 6, while an outer radial surface 100 is provided on the drilling fluid side of the seal 6. The surfaces just described generally define an annular gland 20 of a sealing system located at the base of the shaft 5 between the leg of the bit and the journal bearing 11.

An insulating ring 14 is positioned between the inner radial surface 8 and the seal 6 on the grease side of the seal. With this position, the insulating ring 14 is placed between the journal bearing 11 area and the seal 6 in order to protect the seal 6 from bearing generated heat. Functionally-speaking, the insulating ring 14 offers a thermal insulation barrier positioned between the journal bearing 11 and the seal 6. Heat transmission or radiation from the journal bearing 11 to the seal is minimized (substantially reduced in comparison to implementations lacking the insulating ring 14). The insulating ring 14 is washer-shaped comprised of a flat disk structure with a central opening. An inner circumferential edge 22 of the ring 14 (associated with the central opening) is positioned adjacent the cylindrical head sealing surface 7, while an outer circumferential edge 24 of the ring 14 is positioned adjacent the cylindrical cone sealing surface 9. The opposed top and bottom surfaces 26 and 28 of the ring 14 are positioned adjacent the inner radial surface 8 and seal 6, respectively.

Figure 5:
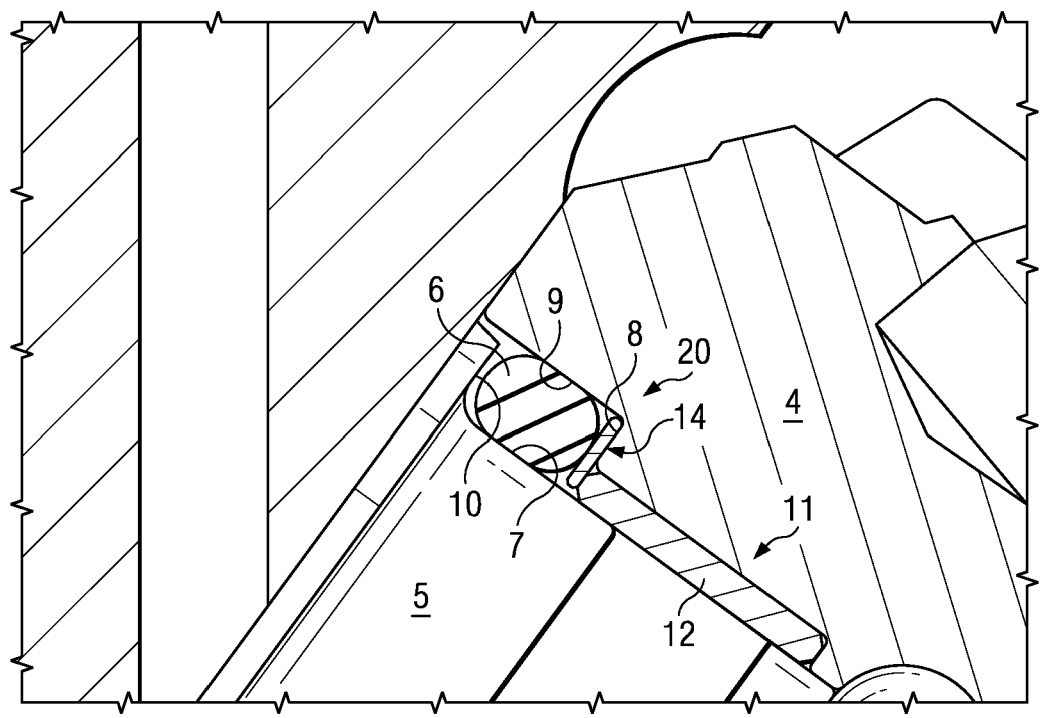

Reference is now made to FIG. 5 which illustrates another embodiment of a seal gland and journal bearing with an insulating ring provided in the seal gland to protect the seal from journal bearing generated heat. The o-ring seal 6 is squeezed between a cylindrical cone sealing surface 9 and a cylindrical head sealing surface 7. An inner radial surface 8 is provided on the grease side of the seal 6, while an outer radial surface 100 is provided on the drilling fluid side of the seal 6. The surfaces just described generally define an annular gland 20 of a sealing system located at the base of the shaft 5 between the leg of the bit and the journal bearing 11. The journal bearing 11 further includes a journal bushing 12 positioned between the rotating cone 4 and the cantilever bearing shaft 5.

Figure 1:
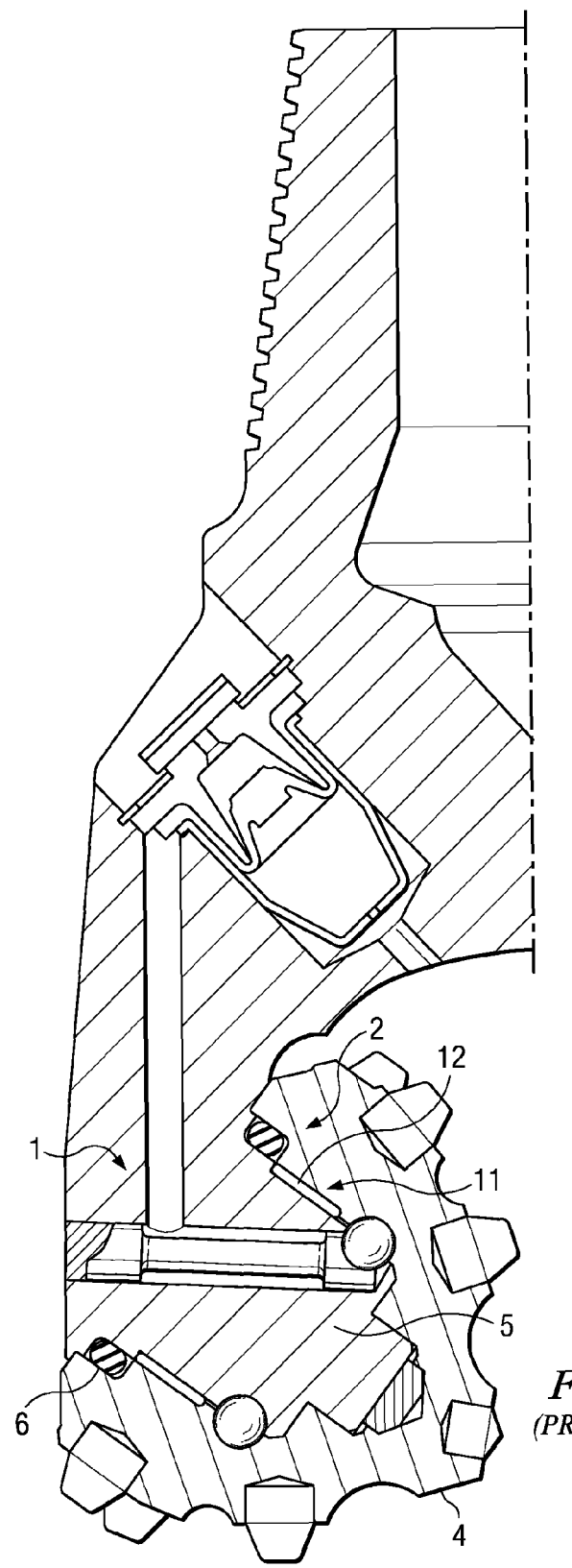
FIG. 1 illustrates a prior art configuration for an earth boring bit.
Figure 2:
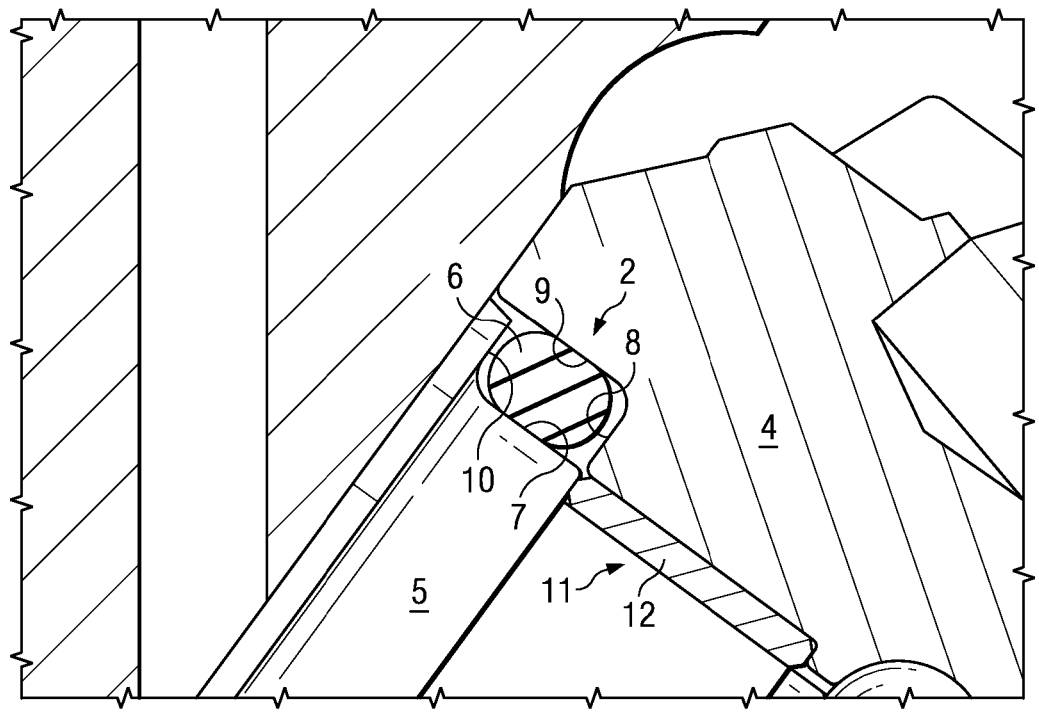
FIG. 2 illustrates a close-up view of the prior art configuration of FIG. 1 focusing on the area of the seal.

An insulating ring 14 is positioned between the inner radial surface 8 and the seal 6 on the grease side of the seal. With this position, the insulating ring 14 is placed between the bushing 12 of the journal bearing 11 and the seal 6 in order to protect the seal 6 from bearing generated heat. Functionally-speaking, the insulating ring 14 offers a thermal insulation barrier positioned between the journal bearing 11 and the seal 6. Heat transmission or radiation from the journal bearing 11 to the seal is minimized (substantially reduced in comparison to implementations lacking the insulating ring 14). The insulating ring 14 is washer-shaped comprised of a flat disk structure with a central opening. An inner edge 22 of the ring 14 is positioned adjacent the cylindrical head sealing surface 7, while an outer edge 24 of the ring 14 is positioned adjacent the cylindrical cone sealing surface 9. The opposed top and bottom surfaces 26 and 28 of the ring 14 are positioned adjacent the inner radial surface 8 and seal 6, respectively. Still further, in the illustrated implementation, the top surface 26 of the ring 14 is also positioned adjacent a radial surface end 32 of the journal bushing 12. It will be recognized that the journal bearing 11 could alternatively have the configuration illustrated in FIG. 2, it which case the included ring 14 need not make contact with the included journal bushing 12.

Figure 3:
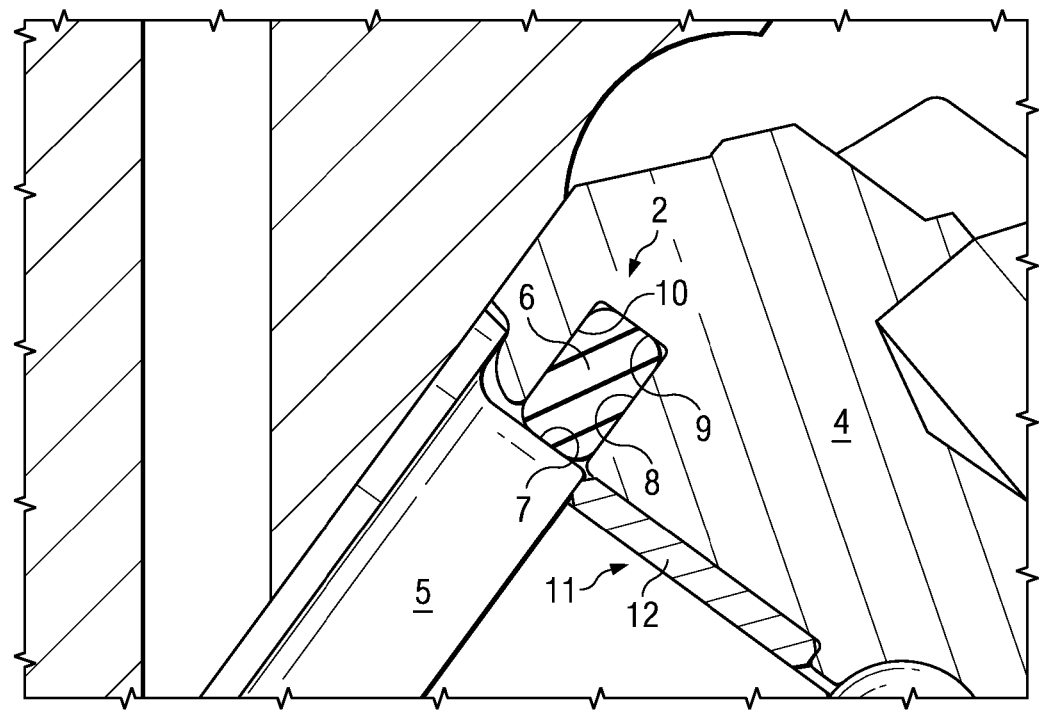
FIG. 3 illustrates another prior art seal configuration.
Figure 6:
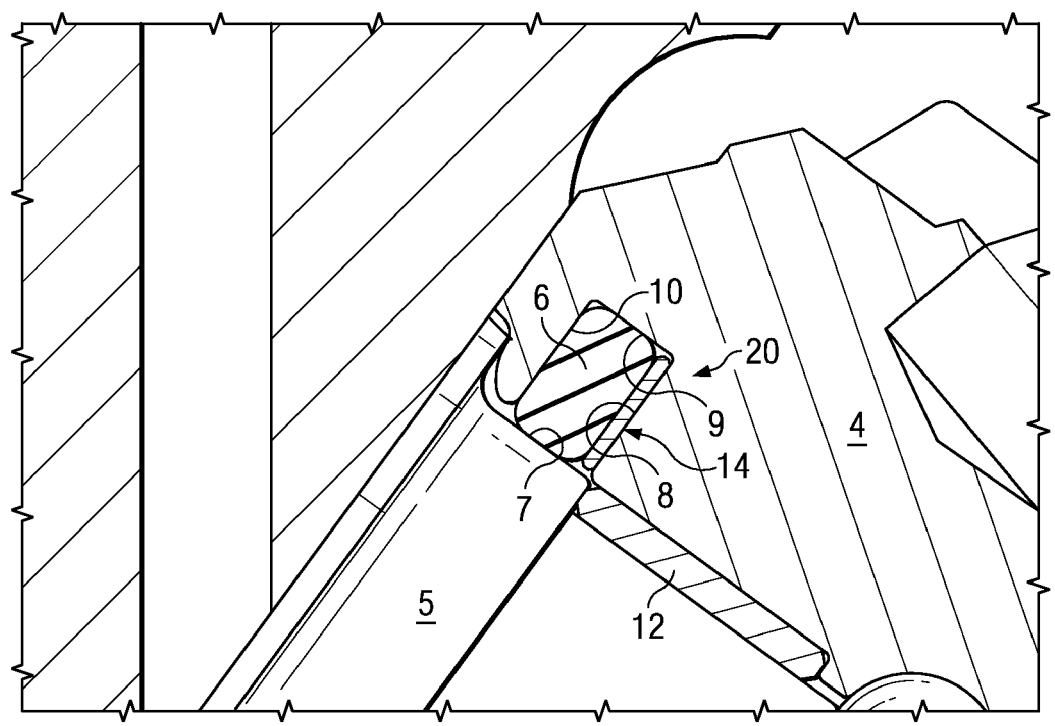

Reference is now made to FIG. 6 which illustrates another embodiment of a seal gland and journal bearing with an insulating ring provided in the seal gland to protect the seal from journal bearing generated heat. The sealing system provides a high aspect ratio seal (see, also, FIG. 3). The seal 6 is squeezed between the cylindrical cone sealing surface 9 and the cylindrical head sealing surface 7. An inner radial cone surface 8 is provided on the grease side of the seal, while an outer radial surface 10 is provided on the drilling fluid side of the seal. The surface 10 is located on the cone 4. The surfaces just described generally define an annular gland 20 of a sealing system located at the base of the shaft 5 between the leg of the bit and the journal bearing 11. A journal bushing 12 is positioned between the head 4 and the cantilever bearing shaft 5 for the journal bearing 11.

An insulating ring 14 is positioned between the inner radial surface 8 and the seal 6 on the grease side of the seal. With this position, the insulating ring 14 is placed between the bushing 12 of the journal bearing 11 and the seal 6 in order to protect the seal 6 from bearing generated heat. Functionally-speaking, the insulating ring 14 offers a thermal insulation barrier positioned between the journal bearing 11 and the seal 6. Heat transmission or radiation from the journal bearing 11 to the seal is minimized (substantially reduced in comparison to implementations lacking the insulating ring 14). The insulating ring 14 is washer-shaped comprised of a flat disk structure with a central opening. An inner edge 22 of the ring 14 is positioned adjacent the cylindrical head sealing surface 7, while an outer edge 24 of the ring 14 is positioned adjacent the cylindrical cone sealing surface 9. The opposed top and bottom surfaces 26 and 28 of the ring 14 are positioned adjacent the inner radial surface 8 and seal 6, respectively.

Figure 7B:
FIGS. 7A and 7B illustrate plan and side edge views, respectively, of the insulating ring used in FIGS. 4-6.
Figure 7A:
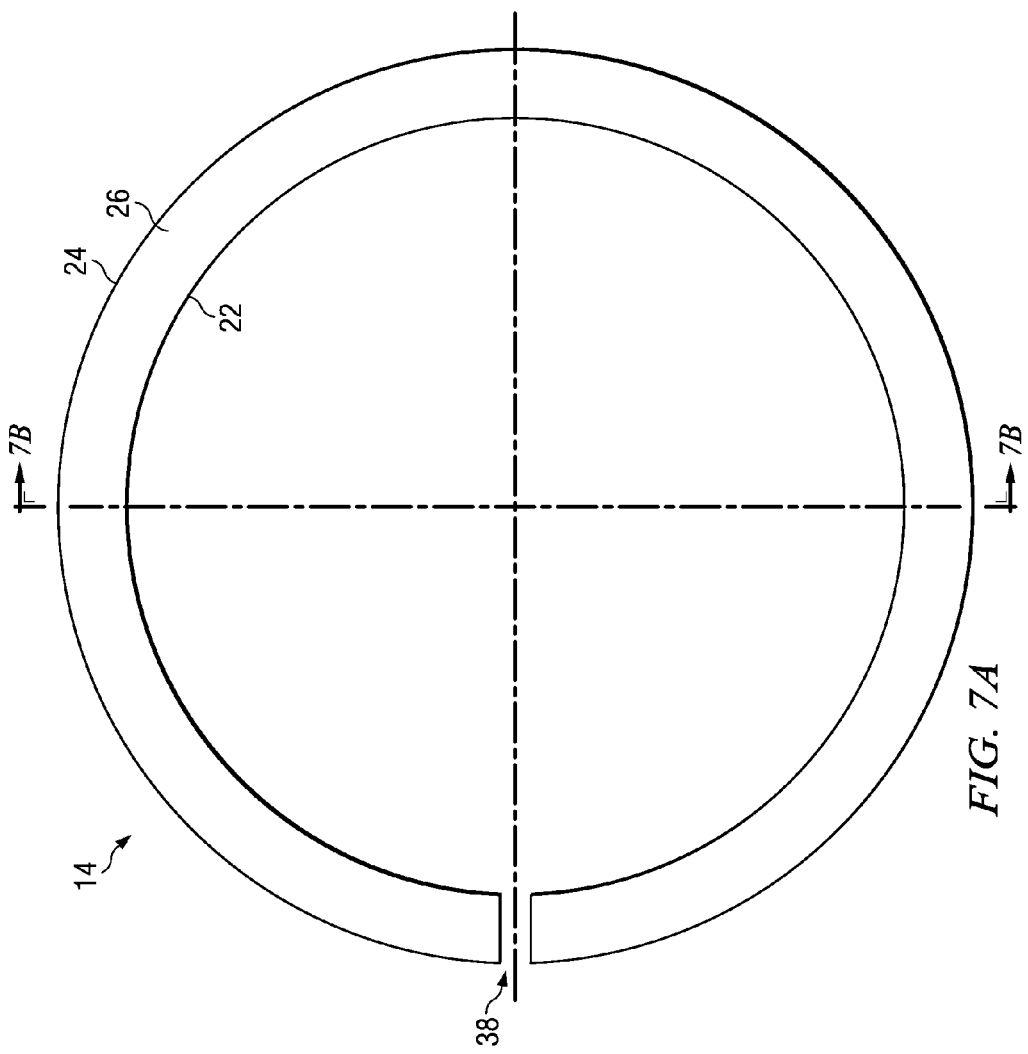

Reference is now made to FIGS. 7A and 7B which illustrate a plan view and a side edge view, respectively, of the insulating ring 14. The insulating ring 14 has a flat ring structure that is generally shaped like a washer (such as a disk with a center hole). The width of the ring member (from outer edge 24 to inner edge 22) generally conforms to be about slightly less than a depth of the gland along the inner radial surface 8. The outer diameter of the ring (defined by outer edge 24) generally conforms to be about slightly less than an outer diameter of the annular gland structure (defined by surface 9). The inner diameter of the ring (defined by inner edge 22) generally conforms to be about slightly more than an outer diameter of the shaft 5 (defined by surface 7). The thickness of the ring is a matter of design choice for achieving a desired thermal insulating function within the confines and constraints of the gland geometry and the selection of the materials used to fabricate the ring. In one implementation, the thickness may be approximately 0.031 inches, but a thicker or thinner ring 14 may be used depending on the properties of the material chosen to make the ring and the specific details of the installation such as gland geometry.

The insulating ring is preferably made of a rigid, insulating plastic material such as a polyetheretherketone (PEEK), also referred to as a polyketone. It will be recognized that other insulating materials known to those skilled in the art would also be suitable material choices for use in fabricating the insulating ring. As an alternative to PEEK, the ring may be made from polyphenylene sulfide (PPS), Glass/cloth Phenolic Laminates, and polyimide (Vespel®) and other like alternatives. Such other materials considered for use in fabricating the insulating ring should be highly resistant to thermal degradation, and resistant to both organic and aqueous environments. Materials of the kind known and ordinarily used in bearings, piston parts, pumps, compressor plate valves, and cable insulation applications make suitable material choices.

It will be noted that the ring 14 includes a radial slit opening 38. The slit 38 is present to allow for installation of the ring within the gland in some instances. The slit 38 further allows for some thermal expansion of the ring to occur within the gland without fear of a deformation which would put pressure on the o-ring seal 6 and adversely affect wear of the o-ring seal. It will be noted that the slit 38 allows for assembly with minimal likelihood of damage to the ring. In this regard the ring slit 38 is a convenient, but not required, option.

In any of the embodiments shown herein, as well as other installations including a sealing annular gland of the type shown, it will be noted that the insulating ring may be sized and shaped as needed to fit within the gland. That fit may in an embodiment be a loose fit which would allow the ring to rotate about the journal bearing 11 axis and within the gland. That fit may alternatively be a press fit within the gland so that the ring rotates with cone 4 rotation. In another embodiment, the ring may be attached to the inner radial surface 8 of the gland so as to rotate with the cone.

Although preferred embodiments of the method and apparatus have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A seal for a rock bit, comprising:
a gland in a cone of said rock bit, said gland including an inner radial surface and a cylindrical surface;
a sealing member installed within the gland and in sealing contact with said cylindrical surface of said gland; and
a non-sealing thermal insulating member installed within the gland between the sealing member itself and the inner radial surface.

2. The seal as in claim 1 wherein the sealing member is an o-ring seal.

3. The seal as in claim 1 wherein the thermal insulating member covers at least substantially all of the inner radial surface of the gland.

4. The seal as in claim 3 wherein the thermal insulating member is made of a rigid, insulating plastic material.

5. The seal as in claim 3 wherein the thermal insulating member is shaped like a washer.

6. The seal as in claim 5 wherein the washer-shaped thermal insulating member includes a radial slit opening.

7. The seal as in claim 1 wherein the cone rotates about a journal bearing, and wherein the thermal insulating member is installed between the sealing member itself and the journal bearing.

8. The seal as in claim 5 wherein the thermal insulating member permits fluid communication between the gland and the journal bearing.

9. The seal as in claim 1 wherein the cone rotates about a journal bearing, wherein the journal bearing includes a journal bushing.

10. The seal as in claim 9 wherein the journal bushing includes a radial surface, and wherein the thermal insulating member covers all of the inner radial surface of the gland and at least substantially all of the radial surface of the journal bushing.

11. The seal as in claim 9 wherein the journal bushing includes a radial surface, and wherein the thermal insulating member does not cover any of the radial surface of the journal bushing.

12. The seal as in claim 9 wherein the journal bushing includes a radial surface which is aligned with the inner radial surface of the gland.

13. The seal as in claim 1 wherein the thermal insulating member is attached to the inner radial surface.

14. The seal as in claim 1 wherein the thermal insulating member touches the o-ring seal.

15. The seal as in claim 1 wherein the thermal insulating member is made of a laminated material.

16. The seal as in claim 1 wherein the thermal insulating member is made of a polyphenylene sulfide material.

17. The seal as in claim 1 wherein the thermal insulating member is made of a polyimide material.

18. The seal as in claim 1 wherein the gland is an annular gland defining a high aspect ratio sealing structure.

19. The seal as in claim 1 wherein the thermal insulating member is made of a material selected from the group consisting of polyetheretherketone, polyphenylene sulfide, Glass/cloth Phenolic Laminates, and polyimide.

20. A rock bit, comprising:
a shaft;
a cone mounted for rotation about the shaft at a journal bearing;
a seal gland defined at least by an inner radial surface;
a compressible seal ring positioned in the seal gland; and
a non-sealing thermal insulating ring installed within the seal gland and positioned between the compressible seal ring itself and the inner radial surface.

21. The rock bit of claim 20 wherein the thermal insulating ring is installed between the compressible seal ring itself and the journal bearing.

22. The rock bit of claim 20 wherein the thermal insulating ring covers at least substantially all of the inner radial surface of the gland.

23. The rock bit of claim 20 wherein the thermal insulating ring insulates the compressible seal ring from heat radiating from the journal bearing.

24. The rock bit of claim 23 wherein the thermal insulating ring is made of a rigid, insulating plastic material.

25. The rock bit of claim 20 wherein the inner radial surface is a surface on the cone.

26. The rock bit of claim 20 wherein the seal gland is an annular gland defining a high aspect ratio sealing structure.

27. The rock bit of claim 20 wherein the thermal insulating member is made of a material selected from the group consisting of polyetheretherketone, polyphenylene sulfide, Glass/cloth Phenolic Laminates, and polyimide.

28. A rock bit comprising:
a shaft;
a cone mounted for rotation about the shaft at a journal bearing;
a seal gland defined at least by an inner radial surface;
a compressible seal ring positioned in the seal gland; and
a thermal insulating ring installed within the seal gland and positioned between the compressible seal ring itself and the inner radial surface;
wherein the thermal insulating ring covers at least substantially all of the inner radial surface of the gland;
wherein the journal bearing includes a journal bushing, and wherein the thermal insulating ring is installed between the compressible seal ring itself and the journal bushing.

29. The rock bit of claim 28 wherein the journal bushing includes a radial surface, and wherein the thermal insulating ring covers all of the inner radial surface of the seal gland and at least substantially all of the radial surface of the journal bushing.

30. The rock bit of claim 28 wherein the journal bushing includes a radial surface, and wherein the thermal insulating ring does not cover any of the radial surface of the journal bushing.

31. The rock bit of claim 28 wherein the journal bushing includes a radial surface which is aligned with the inner radial surface of the seal gland.

32. The rock bit of claim 28 wherein the thermal insulating member permits fluid communication between the seal gland and the journal bearing.

33. A rock bit comprising:
a shaft;
a cone mounted for rotation about the shaft at a journal bearing;
a seal gland defined at least by an inner radial surface;
a compressible seal ring positioned in the seal gland; and
a thermal insulating ring installed within the seal gland and positioned between the compressible seal ring itself and the inner radial surface;
wherein the thermal insulating ring covers at least substantially all of the inner radial surface of the gland;
wherein the thermal insulating ring is shaped like a washer.

34. The rock bit of claim 33 wherein the washer-shaped thermal insulating ring includes a radial slit opening.

35. A rock bit comprising:
a shaft;
a cone mounted for rotation about the shaft at a journal bearing;
a seal gland defined at least by an inner radial surface;
a compressible seal ring positioned in the seal gland; and
a thermal insulating ring installed within the seal gland and positioned between the compressible seal ring itself and the inner radial surface;
wherein the thermal insulating member is made of a laminated material.

36. A rock bit comprising:
a shaft;
a cone mounted for rotation about the shaft at a journal bearing;
a seal gland defined at least by an inner radial surface;
a compressible seal ring positioned in the seal gland; and
a thermal insulating ring installed within the seal gland and positioned between the compressible seal ring itself and the inner radial surface;
wherein the thermal insulating member is made of a polyphenylene sulfide material.

37. A rock bit comprising:
a shaft;
a cone mounted for rotation about the shaft at a journal bearing;
a seal gland defined at least by an inner radial surface;
a compressible seal ring positioned in the seal gland; and
a thermal insulating ring installed within the seal gland and positioned between the compressible seal ring itself and the inner radial surface;
wherein the thermal insulating member is made of a polyimide material.

* * * * *